(12) United States Patent
Barrenscheen et al.

(10) Patent No.: US 12,524,304 B2
(45) Date of Patent: Jan. 13, 2026

(54) ELECTRONIC DEVICE, ELECTRONIC SYSTEM, METHOD FOR OPERATING AN ELECTRONIC DEVICE, AND METHOD FOR OPERATING AN ELECTRONIC SYSTEM

(71) Applicant: Infineon Technologies AG, Neubiberg (DE)

(72) Inventors: Jens Barrenscheen, Munich (DE); Jens Rosenbusch, Munich (DE)

(73) Assignee: Infineon Technologies AG, Neubiberg (DE)

( * ) Notice: Subject to any disclaimer, the term of this patent is extended or adjusted under 35 U.S.C. 154(b) by 72 days.

(21) Appl. No.: 18/489,245

(22) Filed: Oct. 18, 2023

(65) Prior Publication Data

US 2024/0134743 A1 Apr. 25, 2024
US 2024/0232007 A9 Jul. 11, 2024

(30) Foreign Application Priority Data

Oct. 19, 2022 (DE) ...................... 10 2022 127 544.2

(51) Int. Cl.
*G06F 11/10* (2006.01)
(52) U.S. Cl.
CPC ...... *G06F 11/1048* (2013.01); *G06F 11/1004* (2013.01)
(58) Field of Classification Search
CPC ... G06F 11/1048; G06F 11/10; G06F 11/1004
USPC ........................................................ 714/764
See application file for complete search history.

(56) References Cited

U.S. PATENT DOCUMENTS

| | | | | |
|---|---|---|---|---|
| 6,430,723 B2 * | 8/2002 | Kodama | ........... | H03M 13/1515 714/763 |
| 7,913,110 B2 * | 3/2011 | Van Acht | ............ | G06F 11/1068 714/764 |
| 8,112,680 B2 * | 2/2012 | Chung | ................. | G11C 7/1006 714/701 |
| 2007/0268905 A1 * | 11/2007 | Baker | ..................... | H04L 49/90 370/252 |
| 2012/0144272 A1 * | 6/2012 | Franceschini | ....... | G06F 11/1012 714/763 |

(Continued)

FOREIGN PATENT DOCUMENTS

DE 102017208522 A1 11/2018

*Primary Examiner* — Albert Decady
*Assistant Examiner* — Grace V Braden
(74) *Attorney, Agent, or Firm* — Eschweiler & Potashnik, LLC (57) ABSTRACT

An electronic device including a functional unit, a storage unit, and a data transmission apparatus. The functional unit provides a function to a superordinate electronic apparatus. The data transmission apparatus transmits data from the storage unit to the functional unit. The storage unit includes a plurality of memory cells and an error correction unit configured to generate a set of correction data for a set of payload data, to store the set of correction data in the memory cells, to read the set of payload data and the set of correction data from the memory cells in response to an individual read request from the data transmission apparatus, to correct the set of payload data and the set of correction data using the set of correction data, and to make both the corrected payload data and the corrected correction data available for the data transmission apparatus.

17 Claims, 6 Drawing Sheets

(56) References Cited

U.S. PATENT DOCUMENTS

2020/0295783 A1 9/2020 Berman et al.
2021/0089389 A1* 3/2021 Kaynak ............ H03M 13/3715

* cited by examiner

ELECTRONIC DEVICE, ELECTRONIC SYSTEM, METHOD FOR OPERATING AN ELECTRONIC DEVICE, AND METHOD FOR OPERATING AN ELECTRONIC SYSTEM

REFERENCE TO RELATED APPLICATION

This application claims priority to German Patent Application 10 2022 127 544.2, filed on Oct. 19, 2022. The contents of the above-referenced Patent Application is hereby incorporated by reference in its entirety.

FIELD

The disclosure relates to an electronic device, to an electronic system, to a method for operating an electronic device, and to a method for operating an electronic system.

BACKGROUND

An electronic device may have a power management integrated circuit (PMIC), which may have to be furnished with configuration data in order for it to be able to be operated.

For example, the configuration data may define or adjust threshold values or target values, and/or define responses to events. The entire spectrum of configurability can come into consideration here.

An incorrect configuration may lead to a desired operational safety objective being infringed or missed.

Thus, the configuration data should be correct for the operational safety-related function to function correctly.

In some devices, error correction codes (ECC) or similar mechanisms may be added to the actual data and allow identification or even correction of corrupt data.

SUMMARY

In various exemplary embodiments, an electronic device 202 is provided. The electronic device enables access to correction data generated in a storage unit by way of an error correction unit, such that both payload data and the correction data can be provided to a functional unit.

In various exemplary embodiments, an electronic device is provided. The electronic device includes a functional unit for providing a function to a superordinate electronic apparatus, a storage unit and a data transmission apparatus that is configured to transmit data from the storage unit to the functional unit, wherein the storage unit includes a plurality of memory cells that are configured to store sets of payload data and sets of correction data, and an error correction unit that is configured to generate an associated set of correction data for each set of payload data and to store said set of correction data in the plurality of memory cells, in response to an individual read request from the data transmission apparatus, for one of the sets of payload data, to read the set of payload data and the associated set of correction data from the memory cells, to correct the set of payload data and the set of correction data by way of the set of correction data and to make both the corrected payload data and the corrected correction data available for the data transmission apparatus.

In various exemplary embodiments, an electronic device is provided. The electronic device includes a functional unit for providing a function to a superordinate electronic apparatus and a storage unit that includes a plurality of memory cells that are configured to store sets of payload data and sets of correction data and an error correction unit that is configured, for each set of payload data, to generate an associated set of correction data and to store said set of correction data in the plurality of memory cells, in response to a read request from the functional unit, for one of the sets of payload data, to read the set of payload data and the associated set of correction data from the memory cells, to correct the set of payload data by way of the set of correction data and to provide the corrected payload data at a first interface and to provide the correction data at a second interface for transmission to the functional unit.

In contrast to devices in which the correction data are used only internally for correcting the payload data and only the corrected payload data are provided to the internal bus in the event of read access, according to various exemplary embodiments of the present disclosure, both the payload data and the correction data are corrected by the (e.g., non-volatile) storage unit in the event of a read request and provided, as corrected payload data and corrected correction data, at an interface of the storage unit (e.g., the interface with the internal bus).

For example, in order to read the corrected correction data, a second interface or a second read address is provided (in addition to the interface or read address for reading the corrected payload data).

This then makes it possible to use the correction data that have already been generated and corrected as (internal) correction data in the functional unit.

This makes it possible to reduce a required amount of memory space in the storage unit.

Exemplary embodiments of the disclosure are illustrated in the figures and are explained in more detail below.

DETAILED DESCRIPTION

In the following detailed description, reference is made to the accompanying drawings, which form part of said description and in which specific embodiments in which the disclosure may be carried out are shown for illustrative purposes. In this respect, directional terminology such as for instance "top", "bottom", "at the front", "at the rear", "front", "rear", etc. is used with reference to the orientation of the described figure(s). Since components of embodiments may be positioned in a number of different orientations, the directional terminology is used for illustrative purposes and is in no way limiting. It goes without saying that other embodiments may be used and structural or logical changes may be made without departing from the scope of protection of the present disclosure. It goes without saying that the features of the various exemplary embodiments described herein may be combined with one another, unless specifically indicated otherwise. The following detailed description should therefore not be interpreted in a restrictive sense, and the scope of protection of the present disclosure is defined by the appended claims.

Within the scope of this description, the terms "linked", "connected" and "coupled" are used to describe both a direct and an indirect link, a direct or indirect connection, and direct or indirect coupling. Identical or similar elements are provided with identical reference signs in the figures where expedient.

Figure 1A:
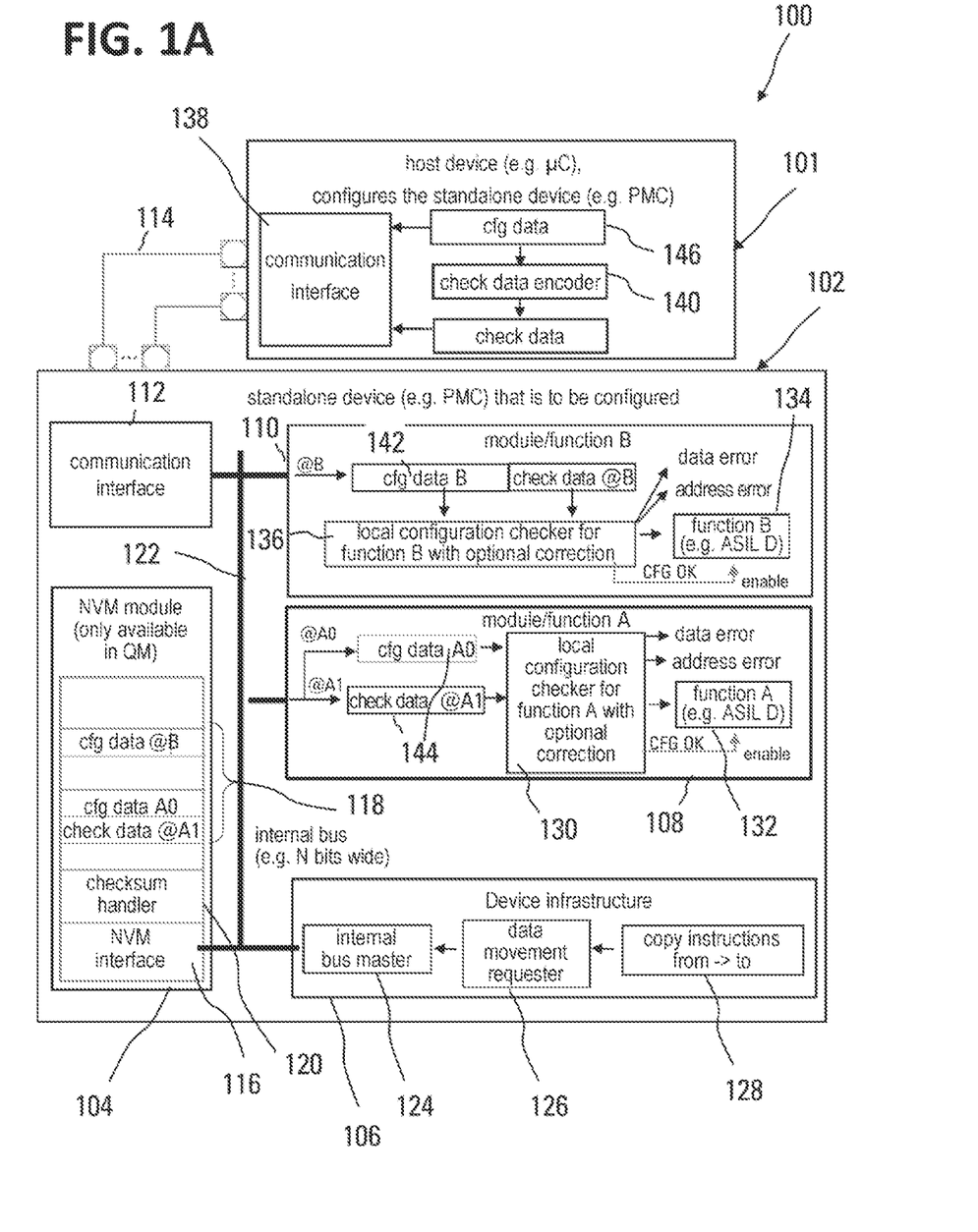
FIG. 1A shows a schematic illustration of an electronic system showing an electronic device.

FIG. 1A shows an example of an electronic device 102 which includes a functional unit (or two thereof in the example from FIG. 1A, namely module A (functional unit 108) and module B (functional unit 110)) for providing a function (e.g., function A or function B) to a superordinate electronic apparatus 101 (e.g., a host device such as a microcontroller).

Correct configuration data ("cfg data") is provided to the functional units 108, 110 to function correctly. At least some of this configuration data is stored in the respective functional unit 108, 110 because the data is necessary for the operation of the functional units 108, 110 (e.g., trim values) or relate to functional configurations.

Although the functional units 108, 110 may be equipped with a memory (not illustrated) (e.g., a non-volatile memory (NVM) such as a one-time programmable (OTP) memory), this memory typically cannot be used simply for storing (e.g., permanently) the configuration data because this memory typically only meets, for example, a quality management (QM) standard, and not a suitable security level (e.g., a higher Automotive Safety Integrity Level (ASIL) level) for storing data that is relevant for operational safety.

Accordingly, the data integrity of the configuration data used in the functional units 108, 110 is ensured in other ways.

As illustrated in FIG. 1A, the configuration data is checked for correctness, prior to transmission to the functional units 108, 110, by way of specially generated check data, and once again following receipt of the configuration and check data in the functional units 108, 110.

A checking unit 130 or 136 contained in each of the functional units 108, 110 is configured to check (and, if necessary, correct) the configuration data by way of the check data.

The electronic device 102 furthermore includes a storage unit 104 (e.g., NVM module), and also a data transmission apparatus (bus master 124, which is part of a device infrastructure 106, in combination with a bus 122), which is configured to transmit data (the configuration data and the check data) from the storage unit 104 to the functional unit 108, 110.

A sequence of read operations from the storage unit 104 and write operations to the functional units 108, 110 (e.g., to configuration registers contained therein) can be controlled by way of a part of the data transmission apparatus 106, 122 (e.g., by way of the device infrastructure 106), in which a list of instructions (e.g., copy instructions including source and destination address) may be stored (e.g., in a memory 128), which may be executed by way of function switches (e.g., a data movement requester 126 and an internal bus master 124).

Figure 1B:
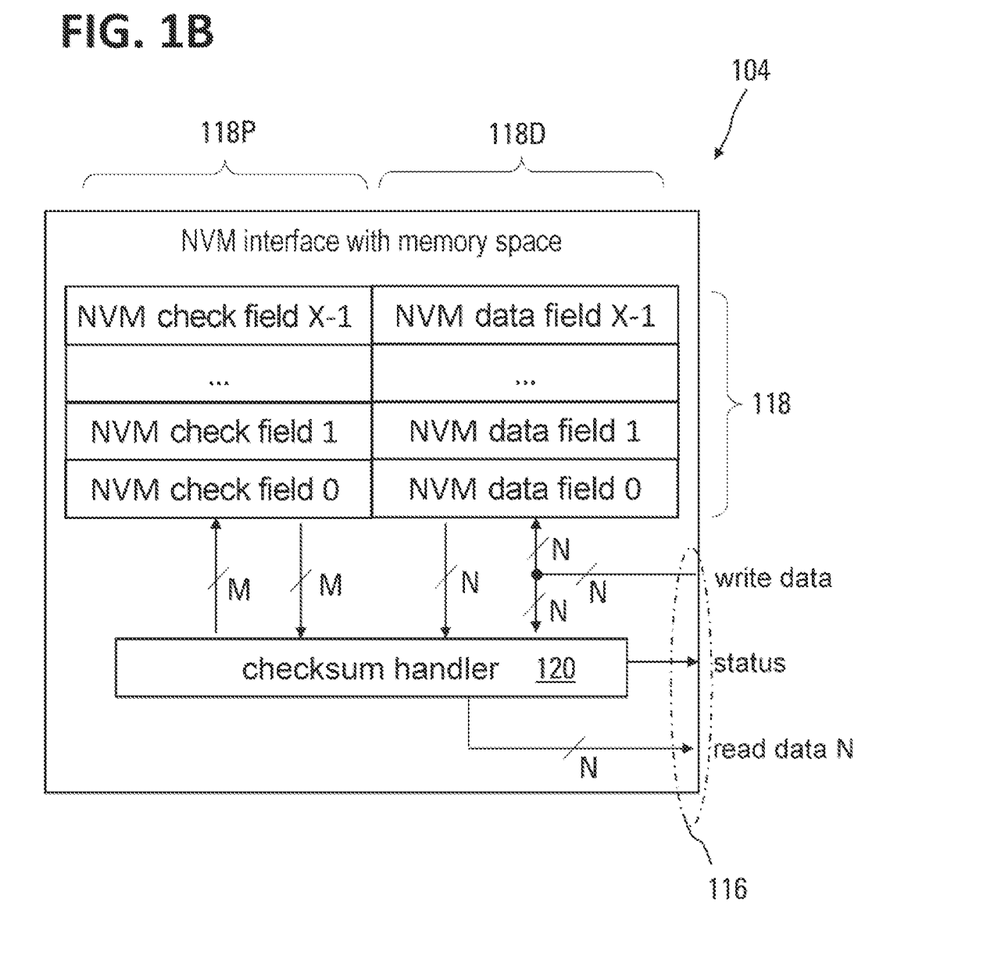
FIG. 1B shows a schematic illustration of a storage unit that is part of the electronic device from FIG. 1A.

The storage unit 104 is illustrated in more detail in FIG. 1B. The storage unit 104 includes a plurality of memory cells 118, which are functionally divided into memory cells 118D for storing payload data and memory cells 118P for storing check data generated by way of an error correction unit 120 (e.g., a checksum handler).

The memory cells 118D for the payload data (e.g., at least the configuration data) may be divided, for example, into payload data address ranges that may each comprise N bits (where N may correspond to the data width of bus 122, but is not limited thereto). The address ranges are labelled "NVM data field 0", "NVM data field 1", etc. A total of X address ranges are provided for payload data.

The error correction unit 120 is configured to generate a set of check data for each of the payload data address ranges (of the data fields) and to store the check data in respective check address ranges assigned to the data address ranges (labelled "NVM check field 0", "NVM check field 1", etc. in FIG. 1B). The number of check address ranges corresponds to the number of payload data address ranges. For example, X check data address ranges may be provided, each of which may comprise M bits.

The check data address range "NVM check field 0" may be assigned here to the payload data address range "NVM data field 0", etc.

In some examples, the check data generated by the error correction unit 120 is used only internally in the storage unit 104 because in some examples, the check data are used exclusively, after a read request by way of the data transmission apparatus 106, 122 for a set of configuration data (e.g., for a dataset that is stored in the payload data range (e.g., memory cells 118D)), to supply the associated check data generated beforehand by way of the error correction unit 120 from the check data range (e.g., memory cells 118P) to the error correction unit 120 and to perform a check on the configuration data before the configuration data are provided to the data transmission apparatus 106, 122 (e.g., via the internal bus).

This ensures a defined error rate for the data read from the storage unit 104 because the memory cells and the read and write integrated circuits have a certain error rate that is compensated for by way of the integrated error detection or error correction mechanism that is provided by the error correction unit 120.

In addition to the corrected data, it is also possible to provide status information that indicates whether a correction was necessary and/or how many bits had to be corrected.

The check data may, for example, have M bits, where M may be greater than, less than, or equal to N (the number of data bits of the configuration data). The size of M in relation to N may depend on N and a desired Hamming distance and/or error detection or error correction capability.

In particular, enabling correction of multiple-bit errors may lead to a situation whereby M>N.

N+M bits of memory space are therefore required to store N bits of configuration data, in order to ensure a certain degree of freedom from errors.

FIG. 1A illustrates a mechanism for providing the function, firstly for the functional unit 110, which forms the module B, and also for the functional unit 108, which forms the module A.

In some examples, in the case of module B (e.g., functional unit 110), the combination of configuration data ("cfg data" in FIG. 1A) and associated check data is so small that both may be accommodated together in one of the payload data address ranges (e.g., memory cells 118D). For example, the configuration data, together with the associated check data, has a width of less than or equal to N bits.

In other words, in this case, the check data are stored as part of the payload data in the memory 118.

However, the error correction unit 120 may have no knowledge that the data stored in the payload data range (e.g., memory cells 118D) for module B (e.g., functional unit 110) already contain check data, and accordingly generates check data which is stored in the associated check data range (e.g., memory cells 118P).

In some other examples, in the case of module A (e.g., functional unit 108), on the other hand, the combination of configuration data ("cfg data" in FIG. 1A) and associated check data is so large that both cannot be accommodated together in one of the payload data address ranges (e.g., memory cells 118D). For example, the configuration data on their own have a width of N bits (or close to N bits).

However, since the check data is also transmitted to the functional unit 108, 110 in order to carry out an internal data check there, but the data transmission apparatus 106, 122 only has access to the payload data address range (e.g., memory cells 118D), the check data for module A is stored in the memory 118 as a separate new payload data entry (that is to say in a new payload data address range).

The error correction unit 120 generates check data, which are stored in each case in the associated check data range (e.g., memory cells 118P), both for the configuration data stored in the payload data range (e.g., memory cells 118D) for module A (108) and for the associated check data stored in another part of the payload data range (e.g., memory cells 118D).

In some examples, a configuration process or operation of the functional unit 108 or 110 includes providing both the corrected content (corrected by way of the error correction unit 120) of the configuration data from the payload data range (e.g., memory cells 118D) and the corrected content (corrected by way of the error correction unit 120) of the check data, which are likewise taken from the payload data range (e.g., memory cells 118D), to the storage unit 104 of the functional unit 108 or 110 in response to a read request.

In functional unit 108 or functional unit 110, the corrected configuration or check data may be supplied to an independent checking unit 130 or 136, which satisfies a required operational safety level. The checking unit 130, 136 may be located outside the storage unit 104 (e.g., within the functional unit 108 or 110). The functional unit 108 or 110 may contain module memories 142 or 144 (e.g., one or more registers per configuration dataset, depending on the size thereof, which is larger in module A than in module B), in which the configuration and check data may be stored before they are supplied to the independent checking unit 130 or 136 for checking or correction.

In some examples, the independent checking unit 130 or 136 then checks the correctness of the configuration data by way of the check data and outputs a check result (e.g., that a data error and/or an address error is present or the data are correct) and/or correct the configuration data if necessary.

Depending on how the check result or the correction of the checking unit 130 or 136 turns out, the functional unit 108, 110 may be configured and the function may be enabled when the configuration data are assessed as correct, or the functional unit 108, 110 may be configured, in the event of incorrect or uncorrectable configuration data, to perform an action predetermined for this case or to adopt a predetermined state, for example a safe state (which may correspond to an off state).

The configuration of the functional units 108, 110 is not limited to an initialization process (e.g., during booting of the electronic device 102). Configuration data may also be updated during ongoing operation.

In some examples, the electronic device 102 and the superordinate electronic apparatus 101 are connected by way of communication interfaces 112 (in the electronic device 102), 138 (in the superordinate electronic apparatus 101) and 114 (e.g., a serial peripheral interface (SPI)) and together form an electronic system 100.

In some examples, new (e.g., modified) configuration data is stored in the superordinate electronic apparatus 101 (e.g., in a memory 146 of the microcontroller) and be transmitted, together with check data generated by way of a check data generator 140 contained in the electronic apparatus 101 (also referred to as check data encoder), to the electronic device 102 (e.g., by way of the communication interfaces 112, 114, 138 and the data transmission apparatus 106, 122).

One problem with the electronic device 102 illustrated above with reference to FIG. 1A and FIG. 1B is that of ensuring that the configuration data not only have to be transferred correctly from the storage unit 104 to the data transmission apparatus 106, 122, but rather that it also has to be ensured, in the functional unit 108 and 110, that the configuration data have been received or stored correctly there before the function is activated, or an error in the configuration data is at least detected and may be responded to accordingly (e.g., data correction, entering a safe state, etc.).

For this purpose, the check data are required for an internal check on the integrity of the configuration data in the functional unit 108 or 110.

While a data integrity check may be carried out in the functional unit 110 (module B), because the check data (generated outside the storage unit 104) have been transmitted together with the configuration data due to the small overall size of the combination of configuration data and check data, this is not possible for the functional unit 110 (module A).

This is because, in the case of the functional unit 108 (module A), the configuration data are already so large (N bits in the example from FIGS. 1A and 1B) that there is no space left to jointly store the check data together with the configuration data in one of the data address ranges (e.g., memory cells 118D).

This means that, in order to make the check data available, they have to be stored as payload data themselves in the data range (e.g., memory cells 118D).

In FIG. 1B, for example, the configuration data could be stored in the "NVM data field 0" and the associated check data (generated externally and transmitted to the storage unit 104) could be stored in the "NVM data field 1".

However, this means that the error correction unit 120 generates two sets of check data:

For the configuration data from the "NVM data field 0", the error correction unit 120 generates check data (e.g., with a size of M bits). These are stored in the check data field "NVM check field 0" associated with the data field "NVM data field 0".

In addition, the error correction unit 120 generates check data (e.g., with a size of M bits) for the check data that are stored in the "NVM data field 1". The check data may for example again have a size of M bits and be stored in the "NVM check field 1".

In other words, although only one N+M dataset is actually required, namely the configuration data of size N and the associated check data of size M, double the amount of memory space is required in the storage unit 104, namely 2×(N+M) bits (or a corresponding number of memory cells).

Figure 2A:
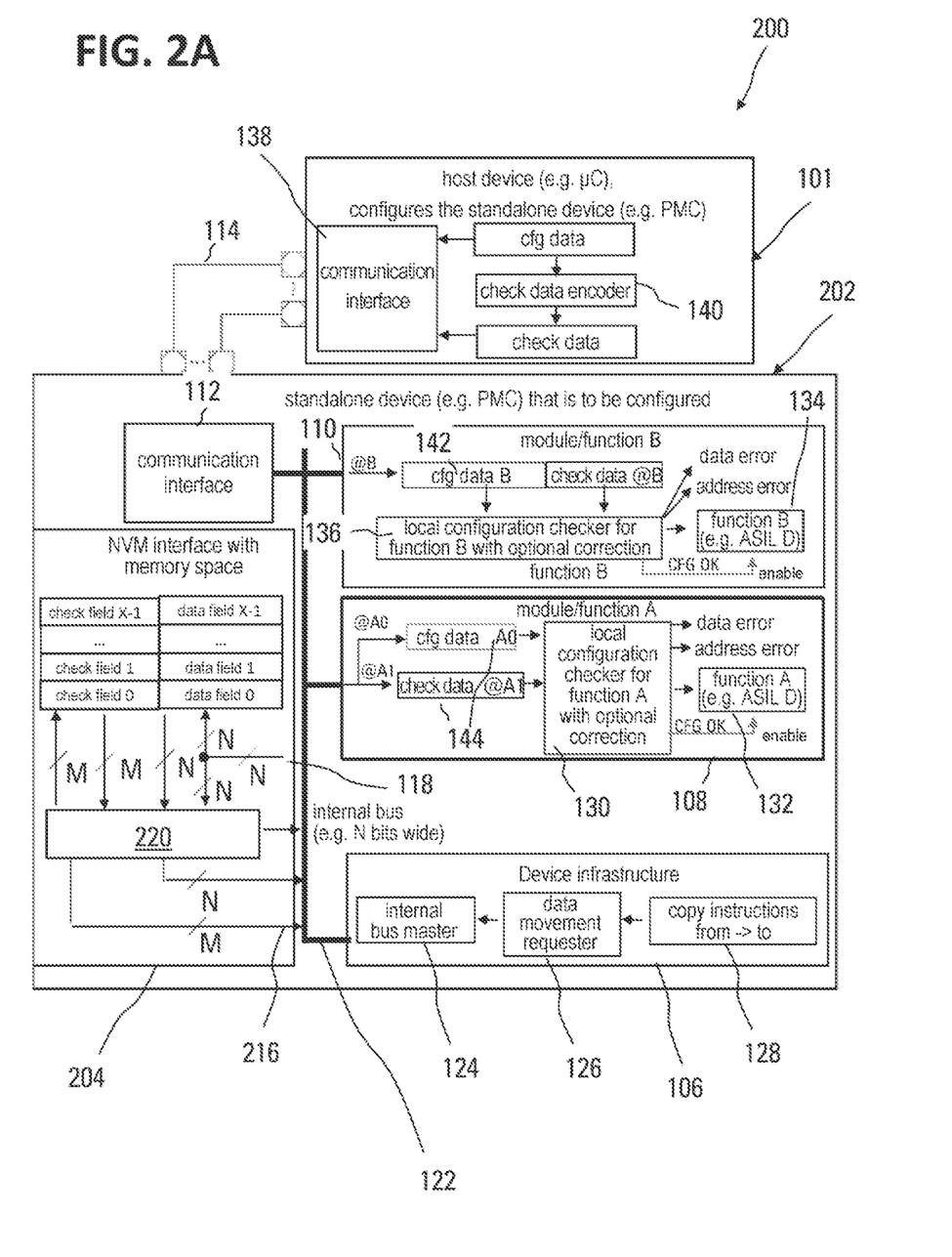
FIG. 2A shows a schematic illustration of an electronic system showing another electronic device.

FIG. 2A shows a schematic illustration of some examples of an electronic device 202 in which the electronic device 202 includes a functional unit (or two functional units in the example from FIG. 2A, namely module A (functional unit 108) and module B (functional unit 110)) for providing a function (function A or function B) to a superordinate electronic apparatus 101 (e.g., a host device such as a microcontroller), and a storage unit 204.

Figure 2B:
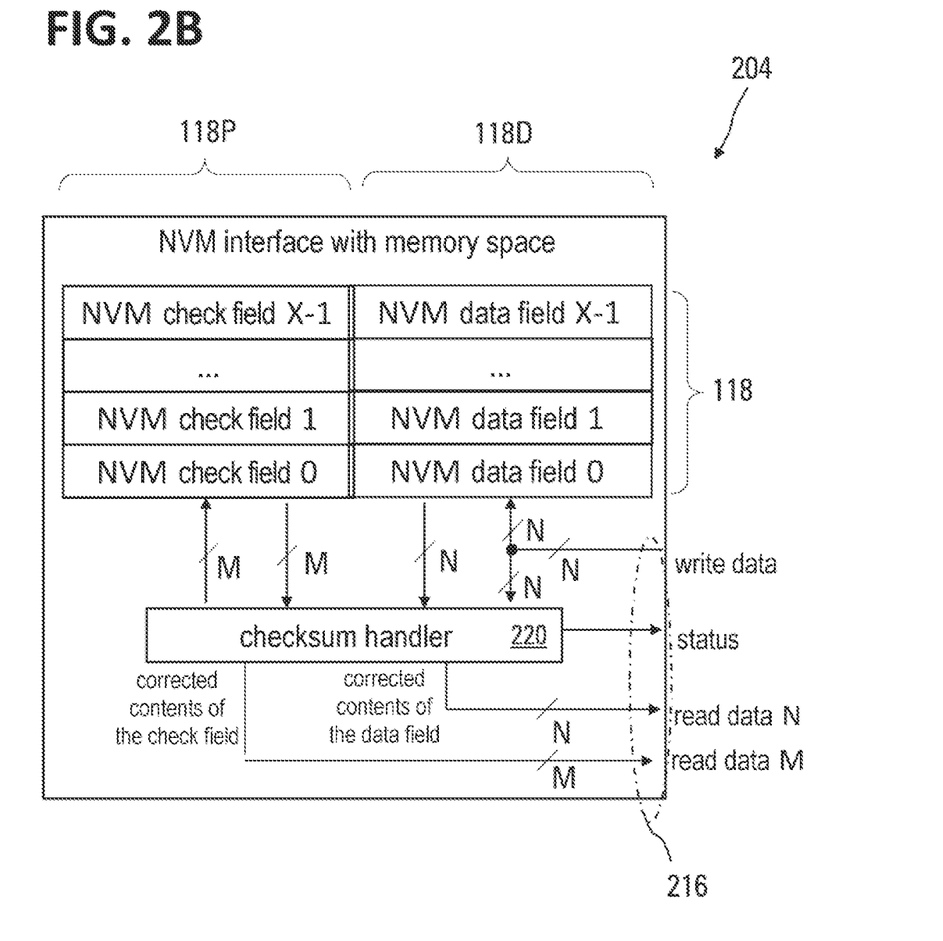
FIG. 2B shows a schematic illustration of a storage unit that is part of the electronic device from FIG. 2A.

FIG. 2B shows a more detailed schematic view of the storage unit 204 from FIG. 2A.

For a correct function, correct configuration data ("cfg data") should be provided to the functional units 108, 110. At least for some of this configuration data is stored in the respective functional unit 108, 110 because the data is necessary for the operation of the functional units 108, 110 (e.g., trim values) or because they relate to functional configurations.

The function A or B may in each case be a function relevant to operational safety. Accordingly, it may be necessary to ensure data integrity of the configuration data used in the functional units 108, 110.

As illustrated in FIG. 2A, the configuration data (also referred to more generally as payload data) may for this purpose be checked for correctness, prior to transmission to the functional units 108, 110, by way of specially generated check data, and again following receipt of the payload and correction data in the functional units 108, 110 upon receipt, periodically or at all times.

In some examples, a checking unit 130 or 136 contained in each of the functional units 108, 110 is configured to check (and if necessary correct) the configuration data by way of the correction data.

Although the term "correction data" may suggest that the data are used to make a correction, it may sometimes be sufficient, in various exemplary embodiments, only to check the payload data and to output a check result, or to correct the payload data before providing them to the functional unit 108 or 110, but only to check them within the functional unit 108, 110.

The electronic device 202 furthermore has the storage unit 204 (e.g., NVM module), and also a data transmission apparatus (e.g., bus master 124, which is part of a device infrastructure 106, in combination with a bus 122), which is configured to transmit data (the configuration data and the correction data) from the storage unit 204 to the functional unit 108, 110.

In some examples, a sequence of read operations from the storage unit 204 and write operations to the functional units 108, 110 (e.g., to configuration registers contained therein) is controlled by way of a part of the data transmission apparatus 106, 122 (e.g., by way of the device infrastructure 106), in which a list of instructions (e.g., copy instructions including source and destination address) are stored (e.g., in a memory 128), which may be executed by way of function switches (e.g., a data movement requester 126 and an internal bus master 124).

The storage unit 204 is illustrated in more detail in FIG. 2B. The storage unit 204 includes a plurality of memory cells 118, which are functionally divided into memory cells 118D for storing payload data (e.g., configuration data for the functional units 108, 110) and memory cells 118P for storing correction data generated by way of an error correction unit 220 (e.g., a checksum handler).

The memory cells 118D for the payload data (e.g., at least the configuration data) may be divided, for example, into payload data address ranges that may each comprise N bits (where N may correspond to the data width of bus 122, but is not limited thereto). The address ranges are labelled "NVM data field 0", "NVM data field 1", etc. A total of X address ranges are provided for payload data.

The error correction unit 220 is configured to generate a set of correction data for each of the payload data address ranges (of the data fields) and to store the correction data in respective check address ranges assigned to the data address ranges (labelled "NVM check field 0", "NVM check field 1", etc. in FIG. 2B). The number of check address ranges corresponds to the number of payload data address ranges. For example, X correction data address ranges may be provided, each of which may comprise M bits.

The correction data address range "NVM check field 0" may be assigned here to the payload data address range "NVM data field 0", etc.

The error correction unit 220 is furthermore configured, in response to a (e.g., individual) read request from the data transmission apparatus 106, 122, for one of the sets of payload data, to read the set of payload data and the associated set of correction data from the memory cells 118D and 118P, to correct the set of payload data and the set of correction data by way of the set of correction data, and to make both the corrected payload data and the corrected correction data available for the data transmission apparatus 106, 222.

In some examples, the error correction unit 220 is configured, in the event of an individual read request targeting a specific set of payload data, to correct the payload data that, by way of the error correction unit 220 using the in the check data range (e.g., memory cells 118P) that is associated with the requested set of payload data, but also additionally to correct the correction data themselves and to provide them at an external boundary of the storage unit 204 (e.g., at an interface different from the corrected payload data).

For example, an additional read address (in addition to the read address for the payload data) may be provided for this purpose.

In some examples, the data transmission apparatus 106, 122 is configured to record both the payload data corrected by the storage unit 204 and the correction data corrected by the storage unit 204 as a result of a read request and to transmit them to the functional unit 108 or 110, respectively. The correction made here to the payload data and the correction data refers to the content thereof at the time of reading from the memory 118.

This means that the check data generated in the storage unit 204, which have also already been corrected by way of the error correction unit 220 as a result of the read request, are provided as (corrected) correction data for an internal check/correction within one of the functional units 108, 110 (in particular in the functional unit 108 (module A)), in addition to the corrected payload data. In this case, the correction or checking of the payload data stored in the module and the correction data may take place periodically or at all times, regardless of the time of reading from the memory 118. This makes it possible to ensure the correctness of the data in the functional units.

This eliminates the need for additional storage of (externally generated) correction data as payload data in an additional payload data range (e.g., memory cells 118D), thus making it possible to save memory space.

The exemplary embodiments differ from what has been described in connection with FIG. 1A and FIG. 1B in that the storage unit 204, unlike the storage unit 104, is configured also to provide the corrected correction data, in addition to the corrected payload data at an interface for providing the N bits of corrected payload data, and a second interface for providing the M bits of corrected correction data that were used by the error correction unit 220 to correct the payload data (and the correction data).

In some examples, the data transmission apparatus 106, 122 is configured to record the corrected payload data and the corrected correction data in one or more access operations from the error correction unit 220 and to transmit them to the destination addresses in the functional units 108, 110.

In some examples, the functional unit 108 or 110 is configured to perform a periodic or permanent error detection and/or an error correction on the payload data corrected by the storage unit 204 by way of the correction data corrected by the storage unit 204 and to provide an error handling result as to whether or not the payload data (previously corrected by the error correction unit 220) are error-free.

In some examples, the functional unit 108, 110 is configured to generate a set of second payload data from the corrected payload data and the corrected correction data (e.g., perform a re-correction on the payload data previously corrected when reading from the memory, but possibly provided with an address error and/or a data error as a result of the transmission by way of the data transmission apparatus 106, 122 and/or the storage process in the functional unit 108, 110, which may also occur later following the storage of the data). The recorrected payload data are referred to as second payload data.

In some examples, the functional unit 108, 110 is configured to configure the configurable function with the aid of the second payload data.

In some examples, the functional unit 108, 110 is configured, in the event of the error handling result whereby the payload data are error-free, to provide the function to the superordinate electronic unit. The corrected payload data may possibly be used here, that is to say a re-correction may be dispensed with in this case.

In some examples, the functional unit is configured, in the event of the error handling result whereby the payload data contain errors, to perform a predetermined action, for example to output an alarm, to go into a safe operating mode (e.g., a switched-off state) or the like.

As an additional aspect that is relevant to operational safety, the data integrity check or correction may also be used as a function test for the error correction unit 220.

By way of example, an error correction unit 220 that is operating incorrectly and that provides the corrected payload data and the corrected correction data to the functional unit 108, 110 may be exposed as faulty in the correction carried out internally in the functional unit 108, 110.

Furthermore, additional access to check data that may be provided by way of the error correction unit 220 may deliver enough information about the payload data and correction data stored in the storage unit 204 (the N+M bits) to be able to establish whether the desired data have been stored in the storage unit 204, for example during manufacturing tests.

The corrected payload data made available by the error correction unit 220 and the corrected correction data may be made available as separate data lines, or may be accessible in succession via different access addresses via a common data bus.

Figure 2C:
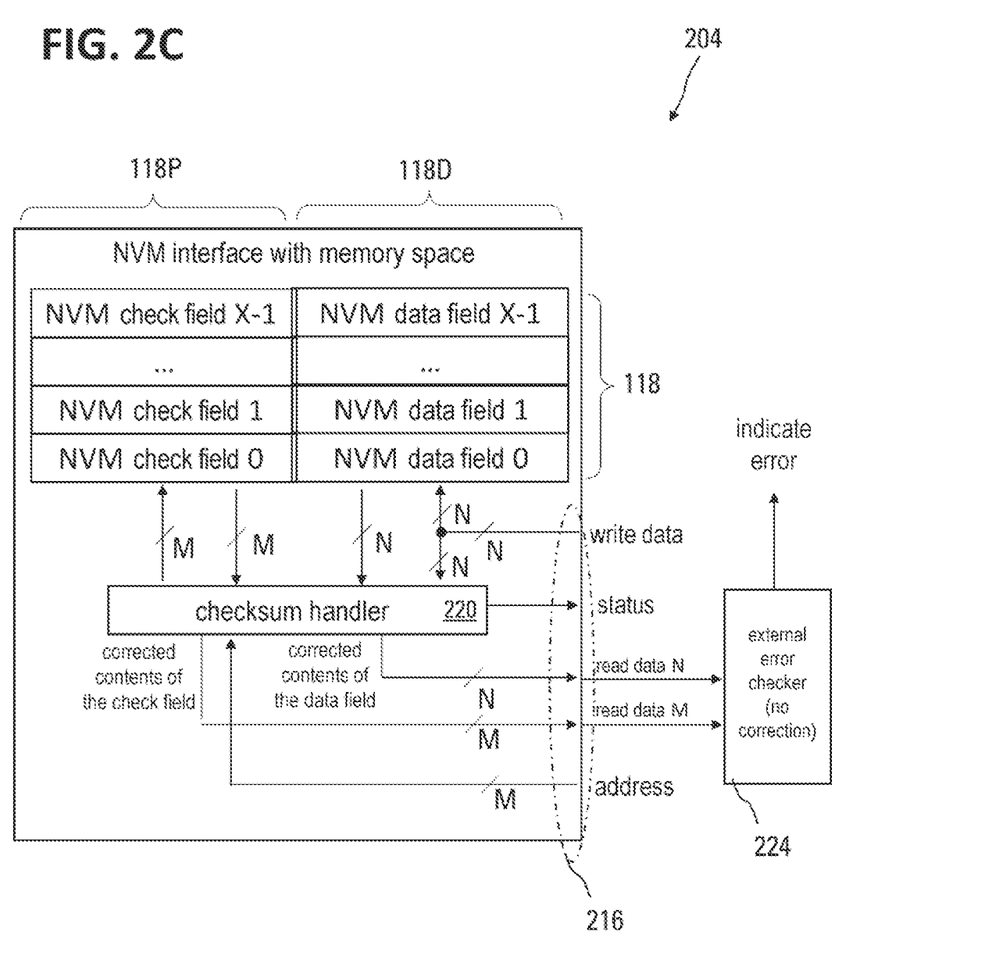
FIG. 2C shows a schematic illustration of a storage unit that is part of the electronic device from FIG. 2A.

FIG. 2C shows a further exemplary embodiment according to which the electronic device 202 additionally includes a checking unit 224 external to the storage unit 204.

In some examples, the corrected payload data and the corrected correction data is provided to the external checking unit 224 in addition to or as an alternative to the functional unit 108, 110.

In some examples, the external checking unit 224 is configured to check, by way of the corrected correction data and the corrected payload data, whether an error is present in the payload data and to output a check result to make the check result available to a monitoring unit that may be part of the electronic device 202 or part of the superordinate electronic apparatus 101.

In various exemplary embodiments, the electronic device 202 is configured to output the corrected payload data and the corrected correction data to the functional unit 108 or 110 for at least a portion of read requests (e.g., targeting a portion of the memory cells 118D; optionally, this may be all memory cells 118D).

In various exemplary embodiments, the electronic device 202 is configured to output the corrected payload data and the corrected correction data to the external checking unit 224 for at least this portion of read requests and/or for another portion of read requests. When the other portion of read requests is concerned, the corrected payload data and the corrected correction data may possibly be output exclusively to the external checking unit 224.

In some examples, the electronic device is configured to check the correct function of the error correction unit 220 by way of the external error checker 224 for each read operation from the memory. The external error checker can be checked in the event of a further check on the corrected payload data and the corrected correction data in a functional unit 108 (redundancy).

Figure 3:
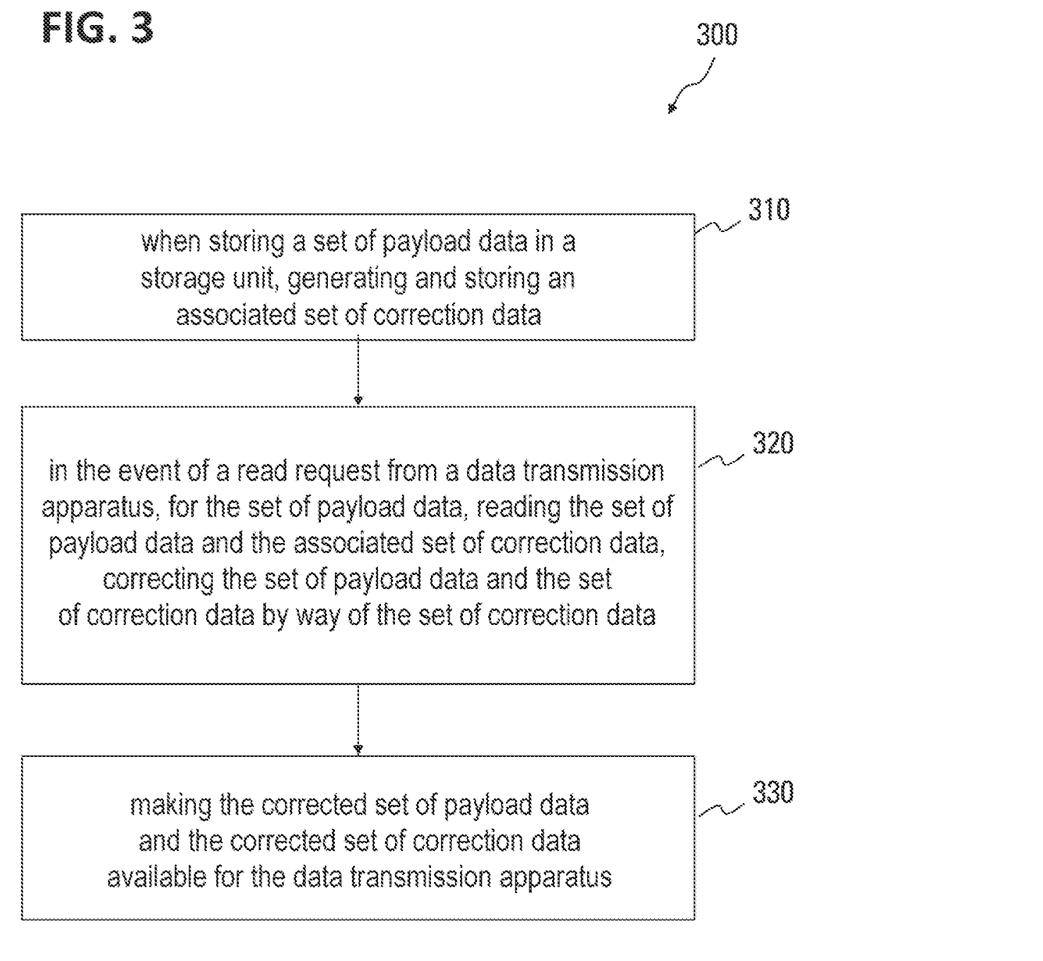
FIG. 3 shows a flowchart of a method for operating an electronic device according to various exemplary embodiments.

FIG. 3 shows a flowchart 300 of a method for operating an electronic device according to various exemplary embodiments.

The electronic device includes a functional unit for providing a function to a superordinate electronic apparatus, a storage unit and a data transmission apparatus for transmitting data from the storage unit to the functional unit.

The method comprises, when storing a set of payload data in the storage unit, generating and storing an associated set of correction data (310).

In the event of a read request from the data transmission apparatus, for the set of payload data, the method comprises reading the set of payload data and the associated set of correction data and correcting the set of payload data and the set of correction data by way of the set of correction data (320).

The method furthermore comprises making the corrected set of payload data and the corrected set of correction data available for the data transmission apparatus (330).

A few exemplary embodiments are provided below.

Exemplary embodiment 1 is an electronic device including a functional unit for providing a function to a superordinate electronic apparatus, a storage unit, and a data transmission apparatus configured to transmit data from the storage unit to the functional unit. The storage unit includes a plurality of memory cells configured to store sets of payload data and sets of correction data, and an error correction unit configured to generate an associated set of correction data for each set of payload data and to store said set of correction data in the plurality of memory cells, in response to an individual read request from the data transmission apparatus, for one of the sets of payload data, to read the set of payload data and the associated set of correction data from the memory cells, to correct the set of payload data and the set of correction data by way of the set of correction data in response to reading the set of payload data and the associated set of correction data, and to make both the corrected payload data and the corrected correction data available for the data transmission apparatus in response to correcting the set of payload data and the set of correction data.

Exemplary embodiment 2 is an electronic device according to exemplary embodiment 1, wherein the data transmission apparatus is configured to transmit both the corrected set of payload data corrected by the storage unit and the corrected set of correction data corrected by the storage unit to the functional unit.

Exemplary embodiment 3 is an electronic device that includes a functional unit for providing a function to a superordinate electronic apparatus and a storage unit that has a plurality of memory cells that are configured to store sets of payload data and sets of correction data and an error correction unit that is configured, for each set of payload data, to generate an associated set of correction data and to store said set of correction data in the plurality of memory cells, in response to a read request from the functional unit, for one of the sets of payload data, to read the set of payload data and the associated set of correction data from the memory cells, to correct the set of payload data by way of the set of correction data and to provide the corrected payload data at a first interface and to provide the correction data at a second interface for transmission to the functional unit.

Exemplary embodiment 4 is an electronic device according to one of the preceding exemplary embodiments, wherein the functional unit is furthermore configured to perform an error detection and/or an error correction on the corrected set of payload data corrected by the storage unit by way of the corrected set of correction data corrected by the storage unit and to provide an error handling result indicating whether or not the corrected set of payload data are error-free.

Exemplary embodiment 5 is an electronic device according to exemplary embodiment 4, wherein the functional unit is furthermore configured to generate a set of second corrected payload data from the corrected payload data and the corrected correction data.

Exemplary embodiment 6 is an electronic device according to one of the preceding exemplary embodiments, wherein the functional unit is furthermore configured to configure the configurable function with the aid of the second corrected payload data.

Exemplary embodiment 7 is an electronic device according to one of exemplary embodiments 4 to 6, wherein the functional unit is furthermore configured, in the event of the error handling result indicating the corrected payload data are error-free, to provide the function to the superordinate electronic unit.

Exemplary embodiment 8 is an electronic device according to one of exemplary embodiments 4 to 7, wherein the functional unit is furthermore configured, in the event of the error handling result indicating the corrected payload data contain errors, to perform a predetermined action.

Exemplary embodiment 9 is an electronic device according to one of the preceding exemplary embodiments, wherein the storage unit has a first interface for making available or transmitting the corrected payload data and a second interface for making available or transmitting the corrected correction data.

Exemplary embodiment 10 is an electronic device according to one of the preceding exemplary embodiments, wherein the provided function is a function relevant to operational safety.

Exemplary embodiment 11 is an electronic device according to one of the preceding exemplary embodiments, wherein the functional unit is a power management integrated circuit.

Exemplary embodiment 12 is an electronic system that has an electronic device according to one of the preceding exemplary embodiments and the superordinate apparatus.

Exemplary embodiment 13 is an electronic system according to exemplary embodiment 12, wherein the superordinate apparatus is a microcontroller.

Exemplary embodiment 14 is a method for operating an electronic device that has a functional unit for providing a function to a superordinate electronic apparatus, a storage unit and a data transmission apparatus for transmitting data from the storage unit to the functional unit, wherein the method comprises, when storing a set of payload data in the storage unit, generating and storing an associated set of correction data and, in the event of a read request from the data transmission apparatus, for the set of payload data, reading the set of payload data and the associated set of correction data, correcting the set of payload data and the set of correction data by way of the set of correction data and making the corrected set of payload data and the corrected set of correction data available for the data transmission apparatus.

Exemplary embodiment 15 is a method according to exemplary embodiment 14, wherein the data transmission apparatus is configured to transmit both the payload data corrected by the storage unit and the correction data corrected by the storage unit to the functional unit.

Exemplary embodiment 16 is a method according to exemplary embodiment 14 or 15, which furthermore comprises performing an error detection and/or an error correction on the payload data corrected by the storage unit in the functional unit by way of the correction data corrected by the storage unit and providing an error handling result as to whether or not the corrected payload data are error-free.

Exemplary embodiment 17 is a method according to one of exemplary embodiments 14 to 16, which furthermore comprises generating a set of second corrected payload data from the corrected payload data and the corrected correction data in the functional unit.

Exemplary embodiment 18 is a method according to one of exemplary embodiments 14 to 17, which furthermore comprises configuring the configurable function by way of the functional unit with the aid of the second corrected payload data.

Exemplary embodiment 19 is a method according to one of exemplary embodiments 16 to 18, which furthermore comprises, in the event of the error handling result whereby the corrected payload data are error-free, providing the function to the superordinate electronic unit.

Exemplary embodiment 20 is a method according to one of exemplary embodiments 16 to 19, which furthermore comprises, in the event of the error handling result whereby the corrected payload data contain errors, performing a predetermined action.

Exemplary embodiment 21 is a method according to one of exemplary embodiments 14 to 20, wherein making both the corrected payload data and the corrected correction data available comprises first of all making the corrected payload data available and then second of all making the corrected correction data available to the functional unit.

Exemplary embodiment 22 is a method according to one of exemplary embodiments 14 to 21, wherein the storage unit has a first interface for making available or transmitting the corrected payload data and also a second interface for making available or transmitting the corrected correction data.

Exemplary embodiment 23 is a method according to one of exemplary embodiments 14 to 22, wherein the provided function is a function relevant to operational safety.

Exemplary embodiment 24 is a method according to one of exemplary embodiments 14 to 23, wherein the functional unit is a power management integrated circuit.

Exemplary embodiment 25 is a method for operating an electronic system, wherein the method comprises operating an electronic device according to one of exemplary embodiments 14 to 24 and providing the function to the superordinate apparatus.

Exemplary embodiment 26 is a method according to exemplary embodiment 25, wherein the superordinate apparatus is a microcontroller.

Further advantageous refinements of the device will be apparent from the description of the method, and vice versa.

In the present disclosure like reference numerals are used to refer to like elements throughout, and wherein the illustrated structures and devices are not necessarily drawn to scale. As utilized herein, terms "module", "component," "unit," "apparatus," "system," "circuit," "circuitry," "element," "slice," and the like are intended to refer to a computer related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example, A or B is to be construed as include only A, only B, and both A and B. Further the phrase "one or more of" followed by A, B, or C is to be construed as including A, B, C, AB, AC, BC, and ABC.

What is claimed is:

1. An electronic device comprising:
  an integrated circuit coupled to a superordinate electronic apparatus;
  a storage unit; and
  a data transmission apparatus that is configured to transmit data from the storage unit to the integrated circuit;
  wherein the storage unit comprises:
    a plurality of memory cells configured to store a set of payload data and a set of correction data; and
    an error correction unit configured to:
      generate the set of correction data for the set of payload data;
      store the set of correction data in the plurality of memory cells;
      read the set of payload data and the set of correction data from the plurality of memory cells in response to an individual read request from the data transmission apparatus;
      correct the set of payload data and the set of correction data using the set of correction data in response to reading the set of payload data and the set of correction data from the memory cells; and
      make both the corrected set of payload data and the corrected set of correction data available for the data transmission apparatus in response to correcting the set of payload data and the set of correction data,
  wherein the integrated circuit is configured to perform an error detection and/or an error correction on the corrected set of payload data corrected by the storage unit using the corrected set of correction data corrected by the storage unit.

2. The electronic device of claim 1, wherein the data transmission apparatus is configured to transmit both the corrected set of payload data corrected by the storage unit and the corrected set of correction data corrected by the storage unit to the integrated circuit.

3. The electronic device of claim 1, wherein the integrated circuit is configured to provide an error handling result indicating whether or not the corrected set of payload data is error-free.

4. The electronic device of claim 1, wherein the integrated circuit is further configured to generate a set of second corrected payload data from the corrected set of payload data and the corrected set of correction data.

5. The electronic device of claim 3, wherein the integrated circuit is further configured to communicate to the superordinate electronic apparatus in response to the error handling result indicating that the corrected set of payload data is error-free.

6. The electronic device of claim 5, wherein the integrated circuit is further configured to perform a predetermined action in response to the error handling result indicating that the corrected set of payload data contain errors.

7. The electronic device of claim 1, wherein the storage unit has a first interface for making available or transmitting the corrected set of payload data and a second interface for making available or transmitting the corrected set of correction data.

8. The electronic device of claim 7, wherein the electronic device further comprises an error checking apparatus configured to check the corrected set of payload data available at the first interface and the corrected set of correction data available at the second interface.

9. The electronic device of claim 1, wherein the integrated circuit is a power management integrated circuit.

10. A method for operating an electronic device, the electronic device comprising an integrated circuit, a storage unit, and a data transmission apparatus for transmitting data from the storage unit to the integrated circuit, the method comprising:
- storing a set of payload data in the storage unit;
- generating and storing a set of correction data for the set of payload data in response to storing the set of payload data in the storage unit;
- reading the set of payload data and the set of correction data in response to receiving a read request from the data transmission apparatus;
- correcting the set of payload data and the set of correction data using the set of correction data in response to reading the set of payload data and the set of correction data;
- making the corrected set of payload data and the corrected set of correction data available for the data transmission apparatus in response to correcting the set of payload data and the set of correction data; and
- performing, with the integrated circuit, an error detection and/or an error correction on the corrected set of payload data corrected by the storage unit using the corrected set of correction data corrected by the storage unit.

11. The method of claim 10, further comprising:
transmitting, with the data transmission apparatus, both the corrected set of payload data corrected by the storage unit and the corrected set of correction data corrected.

12. The method of claim 11, further comprising:
providing an error handling result indicating whether the corrected set of payload data is error-free.

13. The method of claim 10, further comprising:
generating, with the integrated circuit, a set of second payload data from the corrected set of payload data and the corrected set of correction data.

14. The method of claim 12, further comprising:
communicating to a superordinate electronic apparatus in response to the error handling result indicating that the corrected set of payload data is error-free.

15. The method of claim 14, further comprising:
performing a predetermined action in response to the error handling result indicating that the corrected set of payload data contain errors.

16. A method for operating an electronic device, the electronic device comprising an integrated circuit, a storage unit, and a data transmission apparatus for transmitting data from the storage unit to the integrated circuit, the method comprising:
- storing a set of payload data in the storage unit;
- generating and storing a set of correction data for the set of payload data in response to storing the set of payload data in the storage unit;
- reading the set of payload data and the set of correction data in response to receiving a read request from the data transmission apparatus;
- correcting the set of payload data and the set of correction data using the set of correction data in response to reading the set of payload data and the set of correction data;
- making the corrected set of payload data and the corrected set of correction data available for the data transmission apparatus in response to correcting the set of payload data and the set of correction data; and
- performing, with the integrated circuit, an error detection and/or an error correction on the corrected set of payload data corrected by the storage unit using the corrected set of correction data corrected by the storage unit, wherein making both the corrected set of payload data and the corrected set of correction data available comprises making the corrected set of payload data available and then subsequently making the corrected set of correction data available to the integrated circuit.

17. The method of claim 10, wherein the storage unit has a first interface for making available or transmitting the corrected set of payload data and a second interface for making available or transmitting the corrected set of correction data.

* * * * *